UNITED STATES PATENT OFFICE.

SAMUEL H. COCHRAN, OF EVERETT, MASSACHUSETTS.

COMPOUND TO BE USED IN THE PLACE OF BUTTER FOR COOKING PURPOSES.

SPECIFICATION forming part of Reissued Letters Patent No. 10,171, dated August 1, 1882.

Original No. 258,992, dated June 6, 1882. Application for reissue filed June 29, 1882.

*To all whom it may concern:*

Be it known that I, SAMUEL H. COCHRAN, a citizen of the United States, residing at Everett, in the county of Middlesex, and State of Massachusetts, have invented a new and useful Compound to be Used in the Place of Butter and Lard for Cooking Purposes, of which the following is a specification.

I take what are known as "caul" and "kidney" beef suets and trim the same carefully, and then pass the same through a cutter or such process as will soften and prepare the suets for easy rendering. I then place the same in steam-jacket kettles, or other kettles to be heated, and subject the mass to heat of about 150° Fahrenheit, and keep the same in constant agitation until the whole is sufficiently rendered. To purify and give a flavor to the oil, and also to hasten the settling of the scraps, I introduce during the process of rendering about one three-hundredth part of ground or slippery-elm bark. After the scraps are settled I then draw off the clear oil thus prepared for use in the compound. I also take refined cotton-seed oil or any equivalent vegetable oil and place the same in steam-jacket kettles or other vessels, to be heated, and while the same is being heated I mix into the oil about one-seventieth or one-eightieth part of slippery-elm bark powdered or ground. This serves both to purify the oil and to improve its flavor. I then subject the same to heat of about 190° or 200° Fahrenheit for about one and a half hour, and during the process I cause the mass to be constantly agitated. I then remove the steam from the kettle and leave the oil to cool for about eight or ten hours, and then draw off the oil for use in the compound. Beef-stearine is a well-known article of commerce, and is prepared in the following manner, viz: Take beef-suet and render it in usual way—that is, by cutting the suet fine and heating the same in rendering-kettles at a low temperature until the mass becomes liquefied. When the heat is taken off and the scraps are settled, draw off the clear oil into a cooling-tank and allow it to cool until it has become granulated or thick. Then take a piece of cloth suitable for a folding bag, which, when folded, will be in size about five inches by six inches, or any suitable size for the press, and lay the cloth unfolded upon the bottom of the press adapted for this use, or lay the unfolded bag upon a stand to be removed to the press, and place upon the middle of the cloth from one to two pounds of the granulated or thickened oil and fold the ends of the cloth over the same, so when folded the bag thus formed will be about five inches by six inches. I usually lay five or six similar bags side by side upon the bottom of the press. Other similar bags may be so placed upon these until the press is full. Then bring a gentle pressure at first upon the bags, and gradually increase the pressure until the oleine and margarine constituents of the oil are pressed out through the bags, flowing into vessels to receive the same. There is then left the solid part of the oil—the stearine, a clear white and solid cake. This is what I call "beef-stearine." I then take about sixty-eight parts of the prepared cotton-seed oil and twenty-eight parts of the prepared beef-suet oil and add thereto about five parts of beef-stearine, and place the mass in steam-jacket or other vessels and heat the same to about 160° Fahrenheit, constantly agitating or stirring the same for about half an hour. It is then prepared to be drawn off into a cooling-tank, and should be kept in constant agitation all the while until it is cooled to about the consistency of cream. The compound may then be drawn off into packages suitable for the market. The compound thus treated will harden to about the consistency of lard.

The compound thus formed is found to be superior to and more economical than butter or lard for all cooking purposes, and this method of purifying and settling the scraps of suets and purifying the oils by means of slippery-elm is new and useful. Slippery-elm as applied also at the same time corrects the disagreeable odors arising from the oils and imparts an agreeable and pleasant odor when the compound is used.

I am not confined to the exact proportions of the above-described ingredients in the compound, nor am I confined to the exact degrees of heat in treating the same; but I have found the best results as herein set forth.

I disclaim the inventions patented to Henry W. Bradley, of date January 3, 1871, No.

110,626, and of date October 3, 1871, No. 120,026, for "improvement in compounds for culinary use" and "improvement in shortening for culinary uses."

What I claim as my invention, and desire to obtain by Letters Patent, is—

1. The described method or process of purifying and flavoring beef-suet oil, which consists in mixing therewith slippery-elm bark, substantially in the proportions and in the manner and for the purpose shown and described.

2. The described method or process of purifying and flavoring cotton-seed oil and its equivalent oils, which consists in mixing therewith slippery-elm bark, in the proportions, substantially and in the manner and for the purpose shown and described.

3. The combination of beef-suet oil, cotton-seed oil and its equivalents, purified and flavored as described, with beef-stearine and slippery-elm bark, substantially in the proportions set forth, and for the purposes shown and described.

4. A combination of beef-suet oil, cotton-seed oil and its equivalents, with beef-stearine, substantially in the proportions and in the manner and for the purpose shown and described.

SAMUEL H. COCHRAN.

Witnesses:

J. F. NEWTON,

R. F. NAYLOR.